US011790082B2

(12) United States Patent
Yu et al.

(10) Patent No.: US 11,790,082 B2
(45) Date of Patent: Oct. 17, 2023

(54) REASONING BASED WORKFLOW MANAGEMENT

(71) Applicant: International Business Machines Corporation, Armonk, NY (US)

(72) Inventors: Ying-Chen Yu, Taipei (TW); June-Ray Lin, Taipei (TW); Ci-Hao Wu, Taipei (TW); Pao-Chuan Liao, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 17/330,098

(22) Filed: May 25, 2021

(65) Prior Publication Data
US 2022/0382859 A1  Dec. 1, 2022

(51) Int. Cl.
*G06F 21/55* (2013.01)
*G06F 21/60* (2013.01)
*G06F 21/56* (2013.01)
*G06F 21/54* (2013.01)

(52) U.S. Cl.
CPC ............ *G06F 21/554* (2013.01); *G06F 21/54* (2013.01); *G06F 21/566* (2013.01); *G06F 21/602* (2013.01)

(58) Field of Classification Search
CPC ............. G06F 21/50–56; G06F 21/566; G06F 21/577; G06F 21/602
See application file for complete search history.

(56) References Cited

U.S. PATENT DOCUMENTS

| 8,225,407 B1* | 7/2012 | Thrower | H04L 63/1441 |
| | | | 726/25 |
| 8,265,979 B2 | 9/2012 | Golani | |
| 8,316,376 B2 | 11/2012 | Dettinger | |

(Continued)

FOREIGN PATENT DOCUMENTS

| EP | 3579161 A1 | 12/2019 |
| GB | 2576824 A | 3/2020 |
| WO | 2019027597 A1 | 2/2019 |

OTHER PUBLICATIONS

"Selflearning Method to Predict a Workload Indicator for Provisioning of Resources", An IP.com Prior Art Database Technical Disclosure, Original Publication Date: Sep. 18, 2007, IP.com No. IPCOM000158172D, IP.com Electronic Publication Date: Sep. 18, 2007, 11 pages.

(Continued)

*Primary Examiner* — Trong H Nguyen
(74) *Attorney, Agent, or Firm* — David B. Woycechowsky

(57) ABSTRACT

An approach to workflow management in response to a detected security incident in a computer system. The approach may include an inference driven response based on prior artifacts. The inference driven response may predict the condition of the system and the outcomes of actions in response to the security incident. The predictions made by the inference drive response may be based on a machine learning model. The inference driven response may pause or prevent scheduled actions of the system based on the predictions. The inference driven response may continue to monitor the system and dynamically update its predictions for the condition of the system. In response to the updated predictions, the inference driven response may cancel or execute the previously scheduled actions of the system.

9 Claims, 5 Drawing Sheets

(56) References Cited

U.S. PATENT DOCUMENTS

| | | | |
|---|---|---|---|
| 10,204,311 B2 | 2/2019 | Standing | |
| 10,277,619 B1* | 4/2019 | Clark, II | H04L 63/1433 |
| 10,547,623 B1* | 1/2020 | Han | H04L 63/1408 |
| 11,201,890 B1* | 12/2021 | Coull | H04L 63/1416 |
| 2003/0070003 A1* | 4/2003 | Chong | H04L 63/1408 |
| | | | 719/330 |
| 2009/0126023 A1* | 5/2009 | Yun | G06F 21/577 |
| | | | 726/25 |
| 2011/0107424 A1* | 5/2011 | Singh | G06F 21/565 |
| | | | 726/24 |
| 2017/0032130 A1* | 2/2017 | Joseph Durairaj | H04L 41/16 |
| 2017/0076246 A1 | 3/2017 | Volkov | |
| 2017/0230413 A1* | 8/2017 | Maresca | G06N 7/005 |
| 2017/0249574 A1 | 8/2017 | Knijnik | |
| 2018/0124098 A1* | 5/2018 | Carver | G06N 20/00 |
| 2019/0141015 A1* | 5/2019 | Nellen | H04L 63/0272 |
| 2019/0251251 A1* | 8/2019 | Carson | G06F 21/51 |
| 2019/0303195 A1* | 10/2019 | Sundararam | G06F 9/44505 |
| 2020/0320845 A1* | 10/2020 | Livny | G06F 21/566 |
| 2022/0247773 A1* | 8/2022 | Caithness | H04L 63/1425 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

REASONING BASED WORKFLOW MANAGEMENT

BACKGROUND OF THE INVENTION

The present invention relates generally to the field of workflow management, more specifically, reasoning based workflow management based on predicting future system conditions.

Workflow management is an integral part of many enterprises. Efficient and effective utilization of resources is a top priority for any industry. Businesses and organizations face numerous security threats. Neutralizing these security threats is typically a multi-step process with each step having two or more reaction steps ("sub-flows") depending on the outcome of the previous step. In situations where multiple security threats occur, deciding which threat to investigate first can result in costly lost time.

SUMMARY

Embodiments of the present disclosure include a computer-implemented method for reasoning based workflow management. The computer-implemented method includes detecting one or more security incidents within a computer system. The computer-implemented method further includes generating a threat score for each of the one or more security incidents. The computer-implemented method further includes predicting a future system condition based, at least in part, on an action that produces an artifact in response to the one or more security incidents. The computer-implemented method further includes pausing a task scheduled to be executed within the computer system based on the predicted future system condition.

According to another embodiment of the present invention, a computer program product for reasoning based workflow management is disclosed. The computer program product includes one or more computer readable storage media and program instructions stored on the one or more computer readable storage media. The program instructions includes detecting one or more security incidents within a computer system. The program instructions further include generating a threat score for each of the one or more security incidents. The program instructions further include predicting a future system condition based, at least in part, on an action that produces an artifact in response to the one or more security incidents. The program instructions further include pausing a task scheduled to be executed within the computer system based on the predicted future system condition.

According to another embodiment of the present invention, a computer system for reasoning based workflow management. The computer system includes one or more computer system includes one or more computer processors, one or more computer readable storage media, and program instructions stored on the computer readable storage media for execution by at least one of the one or more processors. The program instructions includes detecting one or more security incidents within a computer system. The program instructions further include generating a threat score for each of the one or more security incidents. The program instructions further include predicting a future system condition based, at least in part, on an action that produces an artifact in response to the one or more security incidents. The program instructions further include pausing a task scheduled to be executed within the computer system based on the predicted future system condition.

Figure 1:
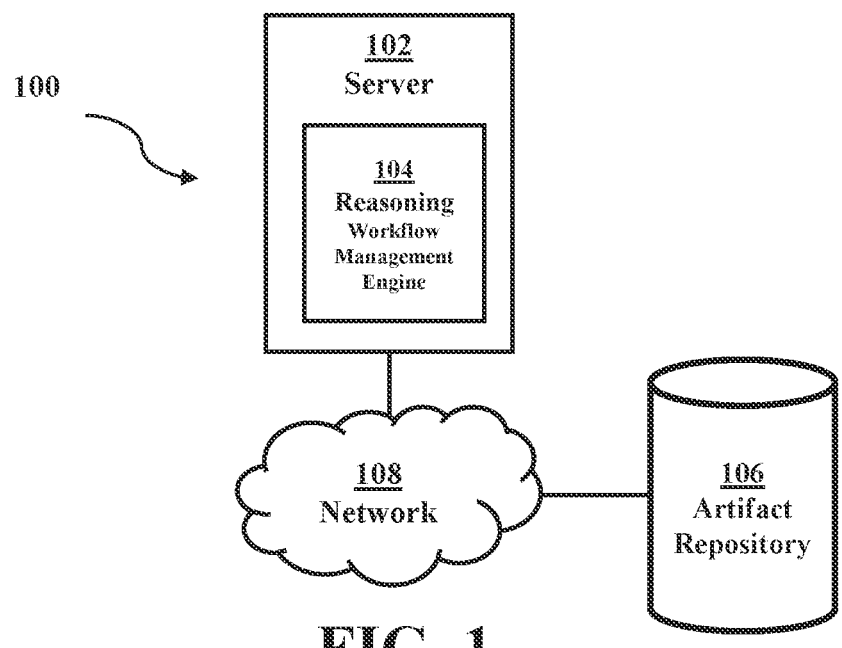
FIG. 1 is a functional block diagram of a reasoning based workflow management environment, generally designated 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted allow for reasoning based workflow management in response to one or more security threats to a system. The embodiments may predict the condition of the system based on data from the threat and artifacts generated by task undertaken in response to previous threats. The data known about the threat is the precursor for tasks that can be undertaken to investigate and/or neutralize the threat. Based on the prediction, one or more tasks within the system may be paused.

In an embodiment of the invention, a threat score for the detected threat may be generated. The threat score may indicate how dangerous the threat is to the system or data within the system. The threat score may be based on one or more factors, including, but not limited to, the originating Internet Protocol address of the threat and a hash created for the threat based on the program code of the threat.

In an embodiment, a prediction can be made dynamically based on a machine learning model that allows for a feedback loop. The feedback loop can have multiple inputs including artifacts from tasks stored in an artifact repository. The feedback loop may also have data relating to the system condition after tasks are undertaken in response to a threat.

In an embodiment, a threat may be detected and investigated and a decision tree for tasks associated with investigating and neutralizing the threat may be determined for the threat based on the information gleaned from detecting the threat. The decision tree may be a basis for the system condition and pausing additional tasks already scheduled within the system.

Referring now to the Figures, FIG. 1 is a functional block diagram generally depicting reasoning based workflow management environment 100. Reasoning based workflow management environment 100 comprises reasoning workflow management ("RWM") engine 104 operational on server 102, and artifact repository 106 interconnected over network 108. In an alternative embodiment, artifact repository 106 is remotely located from server 102.

Server 102 can be a standalone computing device, a management server, a web server, a mobile computing device, or any other electronic device or computing system capable of receiving, sending, and processing data. In other embodiments, server 102 can represent a server computing system utilizing multiple computers as a server system such as in cloud computing environment 50 (depicted in FIG. 5). In an embodiment, server 102 can represent a computing system utilizing clustered computers and components (e.g., database server computers, application server computers, etc.) that act as a single pool of seamless resources when accessed within reasoning based workflow management environment 100. In another embodiment, server 102 can be a laptop computer, a tablet computer, a netbook computer, a personal computer, a desktop computer, or any programmable electronic device or combination of programmable electronic devices capable of executing machine readable program instructions and communicating with each other, as well as artifact repository 106, and other computing devices (not depicted) within reasoning based workflow management environment 100 via network 108. It should be noted, while only a single server 102 is shown in FIG. 1, in other embodiments, multiple servers or other computing devices can be present within reasoning based workflow management environment 100.

Figure 4:
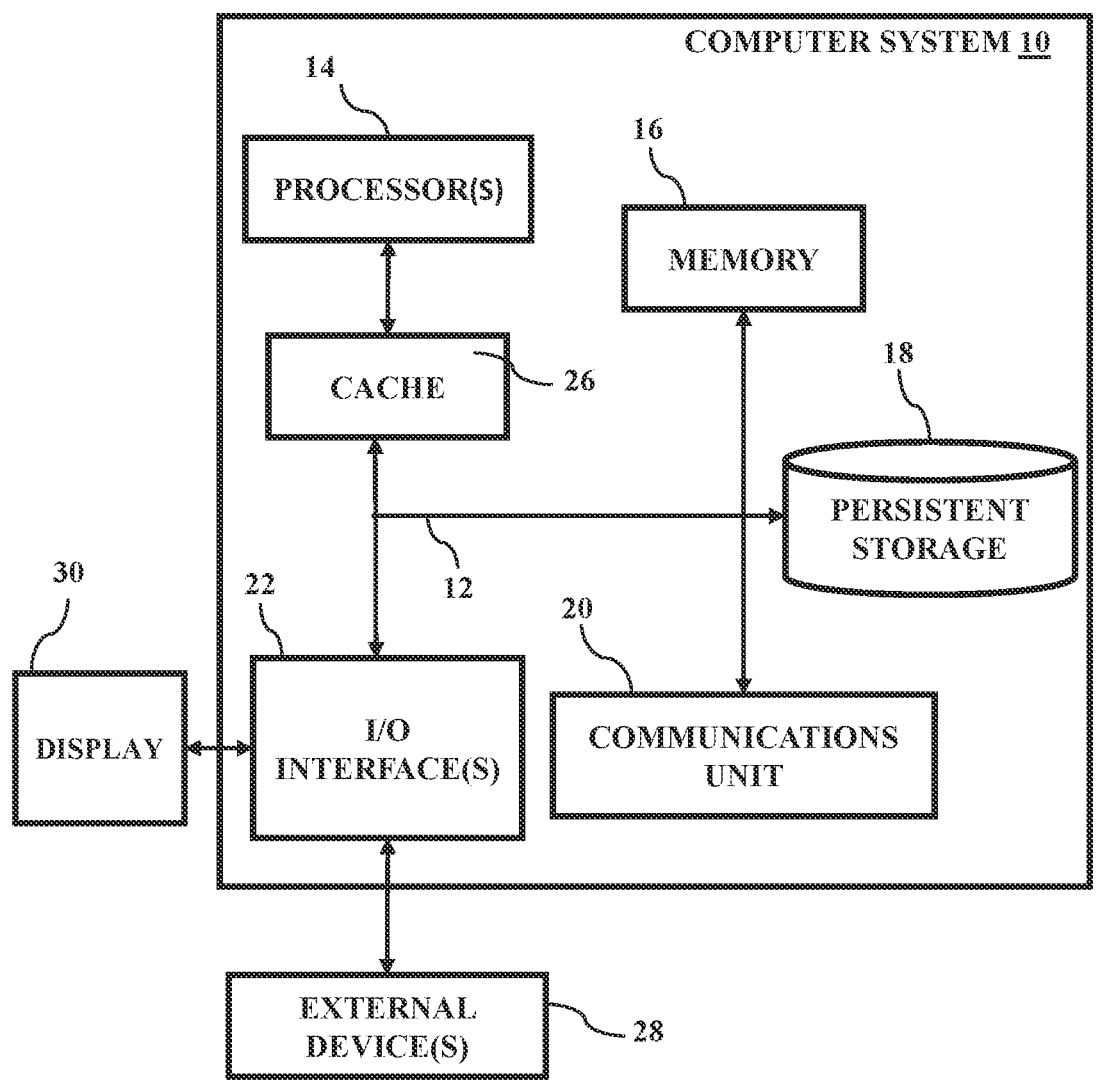
FIG. 4 is a functional block diagram of an exemplary computing system 10 within a reasoning based workflow management environment, in accordance with an embodiment of the present invention.

Server 102 may include components as depicted and described in further detail with respect to computer system 10 in FIG. 4. Server 102 may include components as depicted and described in further detail with respect to cloud computing node 40 of cloud computing environment 50 in FIG. 5.

Network 108 can be a telecommunications network, a local area network (LAN), a wide area network (WAN), such as the Internet, or a combination of the three, and can include wired, wireless, or fiber optic connections. Network 108 may include one or more wired and/or wireless networks that are capable of receiving and transmitting data, voice, and/or video signals, including multimedia signals that include voice, data, and video information. In general, network 108 can be any combination of connections and protocols that will support communications between server 102, artifact repository 106, and external computing devices (not shown) within reasoning based workflow management environment 100.

Reasoning workflow management engine 104 is a computer program capable of detecting a security threat, determining the seriousness of the threat, predicting system conditions based on potential actions in response to the threat, and scheduling workflow tasks based on potential system conditions. In an embodiment, reasoning workflow management engine 104 may be operational on server 102 or multiple servers (not shown) connected via network 108. In some embodiments, reasoning workflow management engine 104 may be multiple computer programs working in unison to dynamically predict system conditions and schedule workflow tasks, based on the predicted condition of the system in response to actions taken to neutralize or investigate one or more detected threats.

Artifact repository 106 is a database capable of retaining artifacts produced by system tasks in response to detected threats. In an embodiment, an artifact can be the outcome of a task. For example, a task investigating a detected threat can include the internet protocol ("IP") address from where the threat originated. The investigation may create a hash for the threat from the program code. Further, the investigation may save the status and/or condition of the system and the actions of the threat (e.g., stealing information, maliciously attacking the system, etc. . . . ) It should be noted, throughout this specification, system status may also be referred to as system condition and should be afforded the same meaning. Additionally, artifacts can include the next response to the threat based on information discovered in the current response task.

Figure 2:
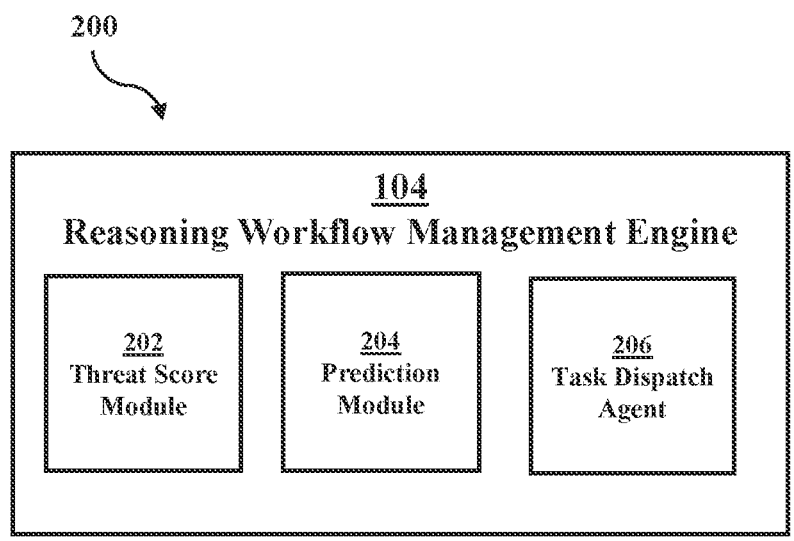
FIG. 2 is a functional block diagram of a reasoning workflow management engine, generally designated 200, in accordance with an embodiment of the present invention.

FIG. 2 is block diagram 200 comprised of reasoning workflow management engine 104. Reasoning workflow management engine 104 can be comprised of threat score module 202, prediction module 204, and task dispatch agent 206.

Threat score module 202 is a computer module that can detect a threat and generate a threat score for a detected threat. In an embodiment, a threat score can be a value associated with the danger the threat may be to the system. For example, a threat may be a malicious program capable of damaging a system or destroying important data. In this scenario, the threat would receive a higher threat score, than say, a malware program that only slows down outgoing signals. The threat score can be an indication of which threat in a multi threat scenario will be given priority. In an embodiment, a threat in a multi threat scenario that has a threat score above a predetermined threshold is given priority. In an embodiment, if multiple threats in a multi threat scenario each have a threat score above the predetermined threshold, the threat with the highest score is given priority. In an embodiment, if only a single threat is detected, a threat score can be an indicator of the amount of resources (computing, memory, human labor) that will be assigned to investigate and/or neutralize a threat.

In an embodiment, threat score module 202 can utilize data stored within artifact repository 106 when generating a threat score for a threat. For example, threat score module 202 may detect a threat via behavioral detection, data mining, heuristic detection, machine learning, or signature-based detection. Threat score module 202 may contain a third party virus, malware, malicious program software capable of detecting malicious software. Based on the detection of a threat or multiple threats, threat score module 202 may identify the signature or program code of each detected threat. The signature or program code of the detected threat may be compared to known threats or artifacts within artifact repository 106. The threat score may be generated from the known information about the threats (e.g., threat mechanism, actions, or portion of system under threat) and the actions required to investigate/neutralize the threat.

Prediction module 204 is a computer module that can predict the future state or condition of the system in response to generated artifacts and potential future actions to investigate and/or neutralize a detected threat(s). For example, if a malware program from a known IP address is detected, the next step can be to quarantine the program in a node which it is detected. The program code of the malware program can be used to generate a hash for the malware program, where it is discovered the hash of the program code is known to within artifact repository. In past events, the malware program has been quarantined, but could not be removed by conventional means, requiring a reboot of the quarantined node within the system. In this instance, prediction module 204 would predict with an 85% probability, based on the IP address the virus came from and a generated hash of the program code, that the node must be quarantined, and other nodes are required to utilize additional computing resources to make up for the quarantined node.

In another example, a known computer virus has been detected after deleting half a database. In this example, based on the IP address of the virus it is known that the entire operating system must be flashed and reinstalled to remedy the computer virus and eradicate it. However, since the computer virus is a new variant, the hash of the virus is unknown. In this instance, prediction module 204 would predict with a 40% probability the entire system must be flashed and reinstalled from a prior backup to eradicate the new variant of the computer virus.

In an embodiment, prediction module 204 can have machine learning capabilities in which it can dynamically learn and update a machine learning model based on artifacts produced by tasks in response to detected threats. For example, an input may include the IP address and hash code of the detected threat and the resulting artifacts based on tasks undertaken in response to the detected threat. Additionally, in an embodiment, the condition and/or status of the system may be included in the input and built into the machine learning model for future predictions.

Task dispatch agent 206 is a computer module that can execute, pause, cancel, or initialize a task in response to a detected security threat. Task dispatch agent 206 can receive the system condition prediction from prediction module 204 and prevent an approved or scheduled task from being executed. For example, in a scenario where a virtual machine must be disabled in response to a detected threat, prediction module predicts the virtual machine will be disabled in its future state. Thus, causing any additional approved tasks relating to the machine to be rendered useless. In this scenario, task dispatch agent 206 will pause any tasks assigned to the virtual machine within the workflow system and reassign the resources to different tasks until task prediction module 204 predicts the virtual machine has resumed normal operations.

In another embodiment, task dispatch agent 206 can pause an approved response until task until prediction module 204 predicts system conditions meet one or more predetermined requirements. For example, in a system where prediction module 204 dynamically predicts system conditions in response to artifacts generated by tasks, task dispatch agent 206 may pause a task associated with quarantining a node if the threat score from threat score module 202 has not reached a threshold.

Figure 3:
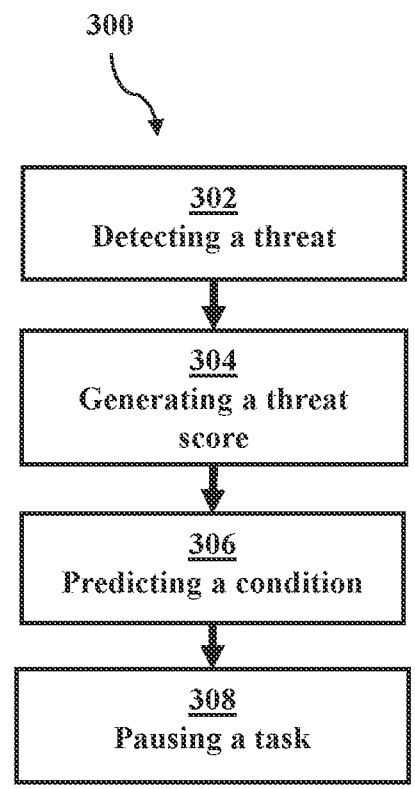
FIG. 3 is a flowchart of a method for reasoning based workflow management, generally designated 300, in accordance with an embodiment of the present invention.

FIG. 3 is a flowchart depicting method 300 for reasoning based workflow management, in accordance with an embodiment of the present invention.

At step 302, threat score module 202 detects a threat within a system. For example, threat score module 202 may detect a signature of a known malware or virus. In another embodiment, threat score module 202 may detect abnormal network traffic associated with the system. In detecting the threat, threat score module 202 may identify the originating IP address and generate a hash value for the threat.

At step 304, threat score module 202 generates a threat score for the detected threat. In an embodiment, threat score module 202 can generate a threat score, which is the probability that a threat is a specific virus, malware, trojan, ransomware, etc. In another embodiment, multiple threats may be detected and threat score module 202 may assign a threat score which is a ranking for which threat is more dangerous to the system. In yet another embodiment, threat score module 202 may assign a threat score to a detected threat based on an importance of the process or application being threatened (e.g., power gird, personnel files, or payment systems, etc. . . . ) In yet another embodiment, threat score module 202 may generate the threat value based on the IP address in which the threat was generated from and/or the generated hash value for the threat, using a dynamic machine learning model with a feedback loop in order to dynamically update threat knowledge within artifact repository 106.

At step 306, prediction module 204 predicts the potential future condition of the system based on the identified threat and threat score. In an embodiment, prediction module 204 can predict the potential future condition of the system based on artifacts generated from previous tasks associated with previous threats. For example, a threat with a threat score of 80% may require a task quarantining a node. Based on past detections of the threat from the same IP address, there was a 30% probability the threat is harmless, only slowing down network traffic, while there was a 70% chance it is malicious, stealing payment data and customer logs. Because there is a much higher chance of the threat being malicious, prediction module 204 predicts the node will require quarantine and further investigation into any stolen data. Thus, the predicted status of the system will have the node quarantined until more artifacts are generated from tasks.

At step 308, task dispatching agent 206 pauses tasks that have been scheduled or approved in response to the predicted system condition. Using the example immediately above, task dispatching agent 206 can receive or retrieve the predicted system condition from prediction module 204. A task associated with the node may have been scheduled or previously approved. For example, the node was scheduled for backup or to be spun down in response to less computing needs. Task dispatching agent 206 can pause the backup task or spin down the task since the node requires further investigation. It should be noted while the tasks are paused, they may still be contained within the workflow queue, but in a paused status. The resources (processing, memory, or human workforce) may be reassigned until a time which a condition gateway has been fulfilled. A condition gateway can be a system condition or artifact detected by reasoning workflow management engine 104, prompting task dispatching agent 206 to unpause and execute the paused task. It should be noted, condition gateway may have a preconfigured or dynamic timeout capability for the paused task in response to various system conditions predicted by prediction module 204 detected.

FIG. 4 depicts computer system 10, an example computer system representative of server 102. Computer system 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications, and network processors, etc.), system memory, peripheral devices, and any other hardware components within a system. For example, communications fabric 12 can be implemented with one or more buses.

Computer system 10 includes processors 14, cache 26, memory 16, persistent storage 18, communications unit 20, input/output (I/O) interface(s) 22 and communications fabric 12. Communications fabric 12 provides communications between cache 26, memory 16, persistent storage 18, communications unit 20, and input/output (I/O) interface(s) 22. Communications fabric 12 can be implemented with any architecture designed for passing data and/or control information between processors (such as microprocessors, communications, and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory (RAM). In general, memory 16 can include any suitable volatile or non-volatile computer readable storage media. Cache 26 is a fast memory that enhances the performance of processors 14 by holding recently accessed data, and data near recently accessed data, from memory 16.

Program instructions and data used to practice embodiments of the present invention may be stored in persistent storage 18 and in memory 16 for execution by one or more of the respective processors 14 via cache 26. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links. Program instructions and data used to practice embodiments of the present invention may be downloaded to persistent storage 18 through communications unit 20.

I/O interface(s) 22 allows for input and output of data with other devices that may be connected to each computer system. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 22. I/O interface(s) 22 also connect to display 30.

Display 30 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
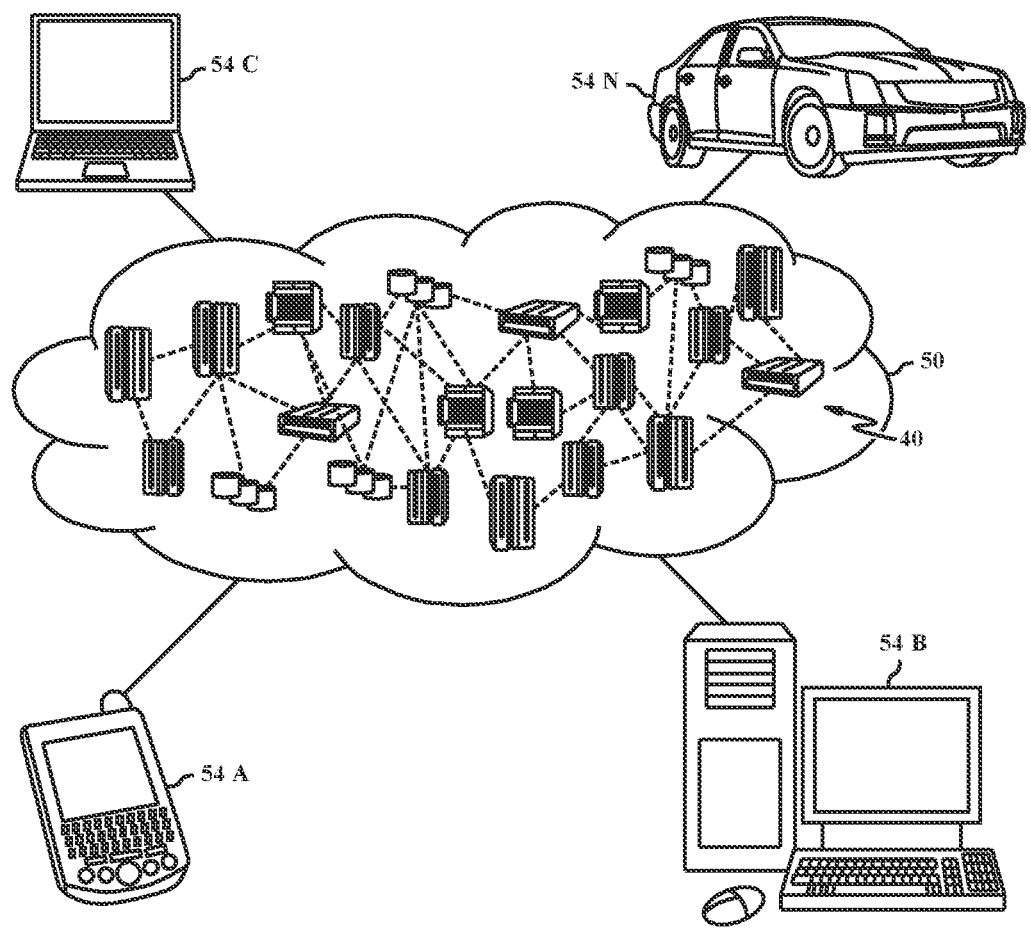
FIG. 5 is a diagram depicting a cloud computing environment 50, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
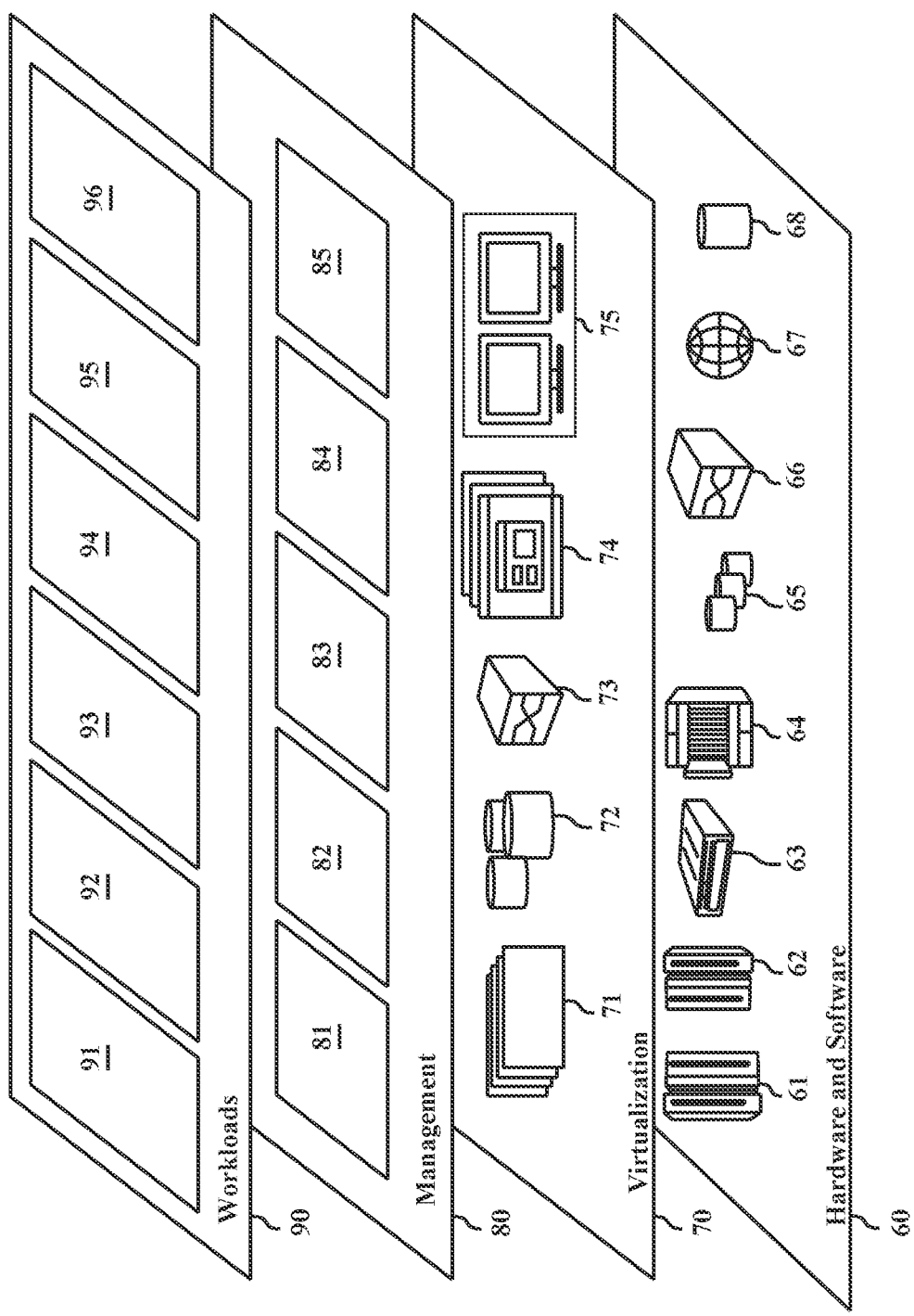
FIG. 6 is a functional block diagram depicting abstraction model layers, in accordance with an embodiment of the present invention.

Referring now to FIG. 6, a set of functional abstraction layers provided by cloud computing environment 50 (depicted in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and reasoning based workflow management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

What is claimed is:

1. A computer-implemented method (CIM) comprising:

receiving a first portion of program code from a first internet protocol (IP) address, through the internet and by a computer system;

calculating a first hash value for the first portion of program code;

detecting, by a processor, that the first portion of program code represents a first security threat to the computer system;

generating, by the processor and in response to the first security threat, the following artifacts: the first IP address from which the first portion of program code was received, the first hash value and an identification of potential damage that can be caused by the first security threat;

receiving a second portion of program code from a second internet protocol (IP) address, through the internet and by the computer system;

calculating a second hash value for the second portion of program code;

detecting that the second portion of program code represents a second security threat to the computer system; and determining a set of responsive action(s) to the second security threat based, at least in part, on a comparison of the first and second IP addresses, a further comparison between the first and second hash values and the identification of potential damage that can be caused by the first security threat.

2. The computer-implemented method of claim 1 further comprising:
executing, by the processor, the set of responsive action(s).

3. The computer-implemented method of claim 2 wherein the set of responsive action(s) includes:
quarantining a portion of memory of a second node of the computer system where the second portion of program code portion is stored; and
subsequent to the quarantining, rebooting the second node.

4. A computer program product (CPP) comprising:
a set of storage device(s); and
computer code stored collectively in the set of storage device(s), with the computer code including data and instructions to cause a processor(s) set to perform at least the following operations:
receiving a first portion of program code from a first internet protocol (IP) address, through the internet and by a computer system,
calculating a first hash value for the first portion of program code,
detecting, by a processor, that the first portion of program code represents a first security threat to the computer system,
generating, by the processor and in response to the first security threat, the following artifacts: the first IP address from which the first portion of program code was received, the first hash value and an identification of potential damage that can be caused by the first security threat,
receiving a second portion of program code from a second internet protocol (IP) address, through the internet and by the computer system,
calculating a second hash value for the second portion of program code,
detecting that the second portion of program code represents a second security threat to the computer system, and
determining a set of responsive action(s) to the second security threat based, at least in part, on a comparison of the first and second IP addresses, a further comparison between the first and second hash values and the identification of potential damage that can be caused by the first security threat.

5. The computer program product of claim 4 further comprising:
executing, by the processor, the set of responsive action(s).

6. The computer program product of claim 5 wherein the set of responsive action(s) includes:
quarantining a portion of memory of a second node of the computer system where the second portion of program code portion is stored; and
subsequent to the quarantining, rebooting the second node.

7. A computer system (CS) comprising:
a processor(s) set;
a set of storage device(s); and
computer code stored collectively in the set of storage device(s), with the computer code including data and instructions to cause the processor(s) set to perform at least the following operations:
receiving a first portion of program code from a first internet protocol (IP) address, through the internet and by the computer system,
calculating a first hash value for the first portion of program code,
detecting, by a processor, that the first portion of program code represents a first security threat to the computer system,
generating, by the processor and in response to the first security threat, the following artifacts: the first IP address from which the first portion of program code was received, the first hash value and an identification of potential damage that can be caused by the first security threat,
receiving a second portion of program code from a second internet protocol (IP) address, through the internet and by the computer system,
calculating a second hash value for the second portion of program code,
detecting that the second portion of program code represents a second security threat to the computer system, and
determining a set of responsive action(s) to the second security threat based, at least in part, on a comparison of the first and second IP addresses, a further comparison between the first and second hash values and the identification of potential damage that can be caused by the first security threat.

8. The computer system of claim 7 further comprising:
executing, by the processor, the set of responsive action(s).

9. The computer system of claim 8 wherein the set of responsive action(s) includes:
quarantining a portion of memory of a second node of the computer system where the second portion of program code portion is stored; and
subsequent to the quarantining, rebooting the second node.

* * * * *